United States Patent [19]
Parkhurst

[11] Patent Number: 5,318,081
[45] Date of Patent: Jun. 7, 1994

[54] HYDRAULIC TREE TRIMMER

[76] Inventor: John Parkhurst, Rte. 1 Box 2, Hughesville, Mo. 65334

[21] Appl. No.: 21,254

[22] Filed: Feb. 23, 1993

[51] Int. Cl.⁵ .......................... A01G 23/06; B27L 1/00
[52] U.S. Cl. ........................................ 144/2 Z; 30/180; 30/379.5; 83/928; 144/34 R; 144/336; 144/343
[58] Field of Search ............... 144/2 Z, 3 D, 34 R, 144/336, 343; 83/928; 30/180, 187, 190, 379, 379.5

[56] References Cited

U.S. PATENT DOCUMENTS

| | | | |
|---|---|---|---|
| 2,930,122 | 6/1957 | Pfundt | 30/228 |
| 3,138,869 | 6/1964 | Parhaniemi | 30/180 |
| 3,213,609 | 2/1964 | Weldon | 60/19 |
| 3,294,131 | 6/1966 | Lawson | 144/34 |
| 3,327,745 | 10/1966 | Meece et al. | 144/34 |
| 3,627,004 | 12/1971 | Ramey | 144/34 |
| 3,905,407 | 9/1975 | Guy et al. | 144/34 E |
| 4,031,619 | 1/1976 | Gregory | 30/180 |
| 4,046,179 | 9/1977 | Crawford | 144/34 E |
| 4,175,598 | 11/1979 | Stoychoff | 144/34 E |
| 4,541,177 | 9/1985 | Hollander | 30/180 |
| 4,616,417 | 10/1986 | Gross | 30/134 |
| 4,670,983 | 6/1987 | Ramus | 30/134 |
| 4,760,644 | 8/1988 | Yirmiyahu et al. | 30/180 |
| 4,802,517 | 2/1989 | Laster | 144/34 |
| 4,911,215 | 3/1990 | Phipps | 144/34 E |
| 4,949,961 | 8/1990 | van der Merwe et al. | 30/245 |
| 4,967,474 | 11/1990 | Wells | 30/228 |

Primary Examiner—W. Donald Bray
Attorney, Agent, or Firm—Richard J. Grundstrom

[57] ABSTRACT

A high reach self centering hydraulic tree trimmer which consists of first a carriage assembly. The carriage assembly consisting of a top plate and a bottom plate. The plates are separated by spacers and secured together with a plurality of fasteners. A pair of cutting blades are contained between the top plate and the bottom plate. The blades are reciprocal of each other and each have a front end, center region, back end, outer edge, inner edge and a cutting edge extending along the inside edge. The blades are self centering about an object to be cut by pivoting independently from each other They pivot about separate pivot points in the center region of the blades. A pivot pin or bolt is used as a pivot device extending from the top plate to the bottom plate. A hydraulic cylinder is used to operate the blades. The hydraulic cylinder is pivotally attached to the back ends of the blades. This operation causes the blades to pivot independently about the pivot points resulting in the cutting surfaces closing upon each other. There is included an attachment means connected to the carriage assembly for attaching the tree trimmer to a bucket or other lifting means on a tractor or other such vehicle. There is also an optional positioning apparatus for pivoting the tree trimmer for cutting trees, branches, limbs or brush at different angles.

13 Claims, 7 Drawing Sheets

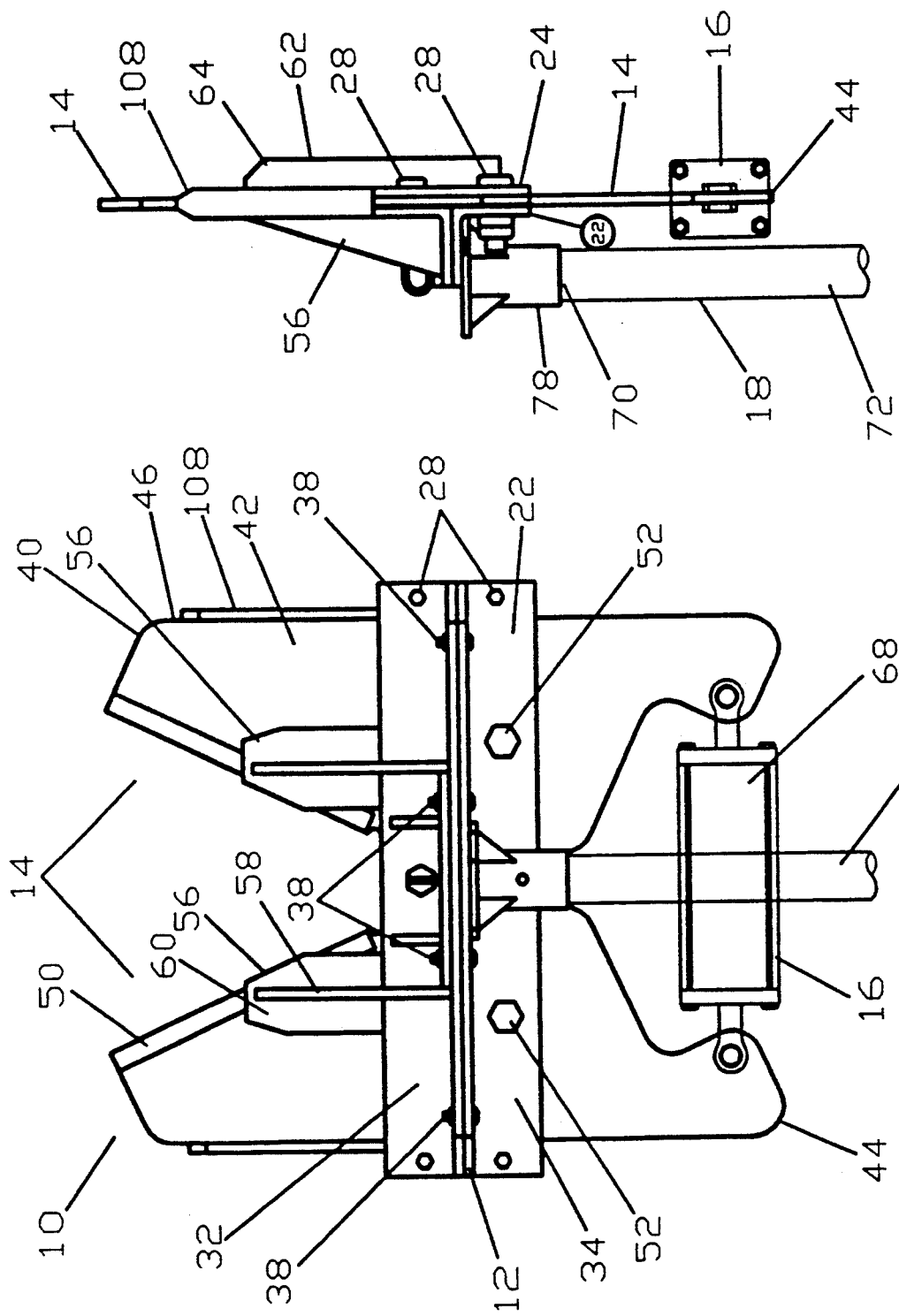

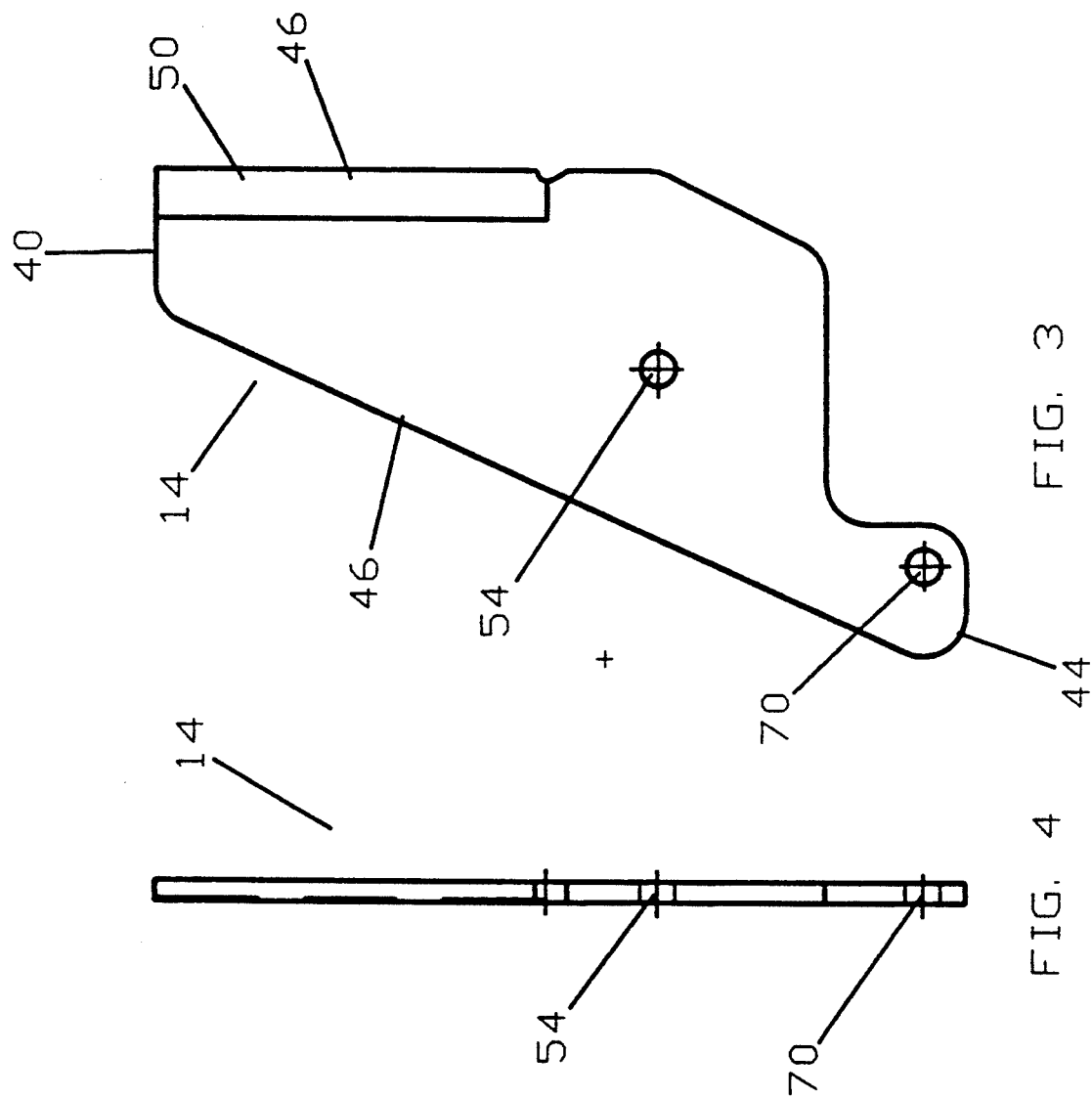

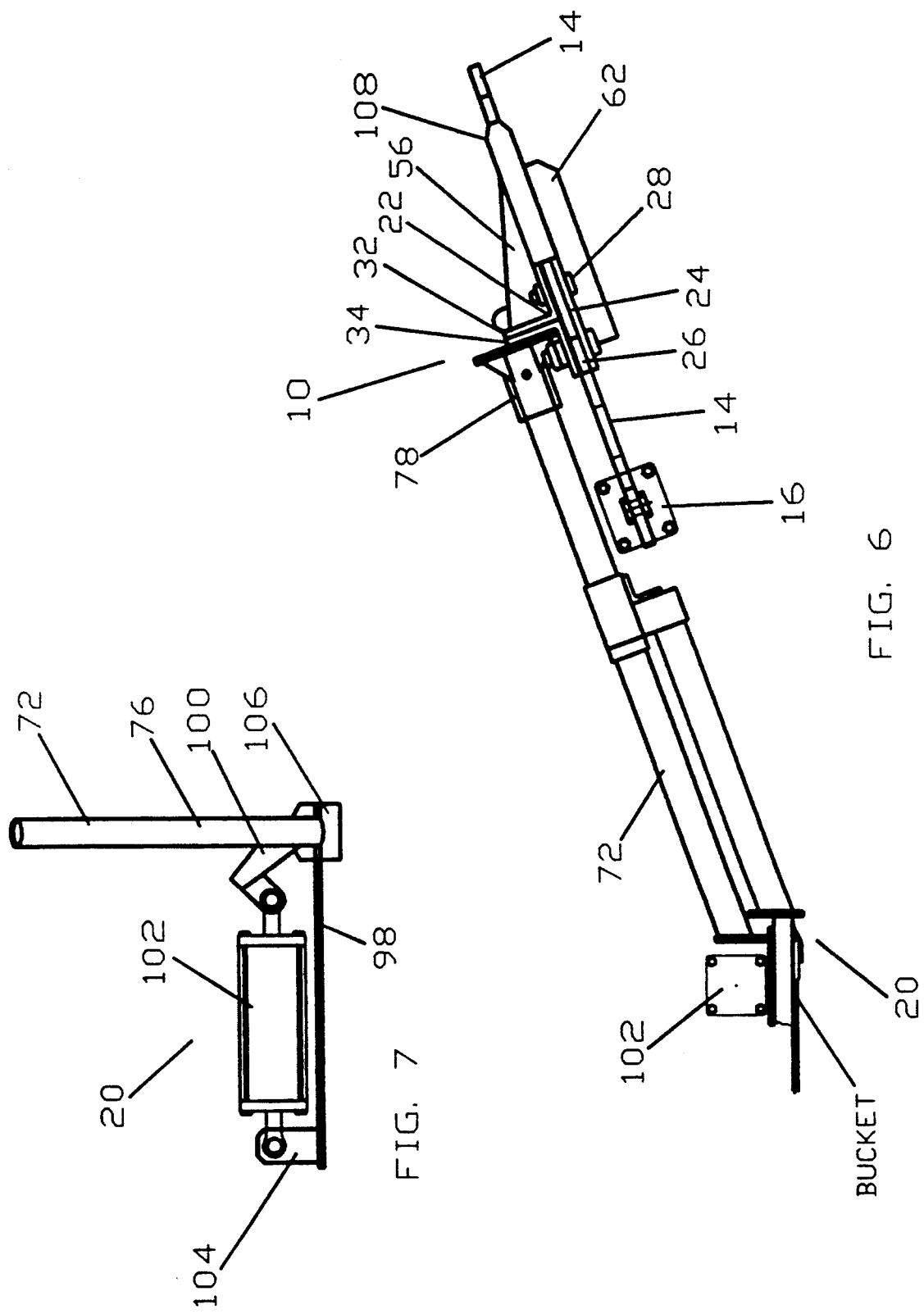

HYDRAULIC TREE TRIMMER

BACKGROUND OF THE INVENTION

The present invention relates to a hydraulic tree trimmer and more particularly to a high reach hydraulic tree trimmer which has dual self centering blades operated by a hydraulic cylinder.

There are several different types, designs, makes and manufacturers of hydraulic tree trimmers, clippers or shears. Generally each of the different types or design of trimmers, or shears have a specific purpose. Each of the different styles, designs or type have certain advantages or disadvantages depending on the particular application. One type may work there another Will not work.

There are several types of hand held trimmers and shears. These can range from small one hand operated shears to larger two hand operated trimmers. There are also hand operated power shears of several different designs. The hand held power operated trimmers and shears may be powered electrically, by gas engine, hydraulically (by hand operated pumps or external pumps controlled by the operator), or even pneumatically. Each type or design have certain advantages and disadvantages for specific purposes.

The blade designs of the shears and trimmers also have a number of different designs. There are blades which are long and narrow and some in a hook shaped design which operate in a scissors type action. This may include designs which have different type of actions. There are some designs having a single fixed blade and one pivotal blade, and there are designs in which the blades pivot independent of each other. There are curved blades, straight blades, rounded blades, serrated blades, single edge blades and double edge blades.

In addition to hand held trimmers and shears, there are larger varieties which attach to heavy equipment, such as bulldozers, tractors, high boys, or other self propelled vehicles. There are also all sizes in between. There are even designs which are suspended from a helicopter or crane which can operate under water.

The invention described herein relates to the heavy duty trimmers which can be mounted on a tractor, backhoe, high boy or the like. Although there are several designs known in the art, most are not designed to be readily attached and removed. Most are also designed for specific attachment to specific equipment and have limited application. It is also common that in these larger varieties the object being cut must be specifically located in respect to the blades or blade. If not located within the predefined area between the cutting surfaces, either the equipment will shift during the cutting action, the blades will not perform as designed or an equipment failure could occur.

As indicated above, there are designs having a fixed blade and a single pivoting blade and there are designs having dual pivotal blades. Some operate in a scissor type action and others operate in a specific action in accordance with the design. Each of these designs have specific means of operations, but most of the heavy duty types are hydraulically operated with a single or with multiple hydraulic cylinders.

There are heavy duty type of trimmers designed to cut trees at the trunk and are attached to the vehicle at a low level. Then there are other types that are attached to an arm, or the like, for cutting the tree at the trunk and trimming branches higher in the tree.

Accordingly, it is an object of the present invention to provide an Hydraulic Tree Trimmer that is adapted to provide for a tree trimmer which is easily attached to and removed from a Wide Variety of different vehicles. With the Hydraulic Tree Trimmer of this invention it has been found that it will mount easily to most tractors, if not all, and other vehicles that have some sort of lifting means and a hydraulic system.

Another object of the present invention is to provide a hydraulic tree trimmer that is constructed to provide a high reaching tree trimmer which can be used to cut, trim or prune branches and limbs from trees without the need of ladders, chainsaws, and climbing of the tree. The hydraulic tree trimmer of this invention is preferably mounted on a lifting means on a vehicle to provide for cutting at a range of cutting heights from the ground level to an elevated height, limited by the lifting means and means of attachment.

A further object of the present invention is to provide an hydraulic tree trimmer that is adapted to be self centering about the object to be cut. This feature eliminates the need for near perfect alignment of the blades with the object which is necessary to prevent damage or unneeded stresses on the equipment, thereby substantially reducing the time spent cutting trees or branches and reducing equipment failure and breakage.

Still another object of the present invention is to provide a hydraulic tree trimmer that can be used to cut trees at ground level, branches and limbs high in a tree or to cut brush, without the need to change any equipment.

Still a further object of the present invention is to provide a hydraulic tree trimmer that is simple to construct, easy to operate and affordable to the persons needing such a tree trimmer.

SUMMARY OF THE INVENTION

To accomplish the foregoing and other objects of this invention there is provided a Tree Trimmer and more particularly to a high reach self centering hydraulic tree trimmer mountable on the bucket of a tractor or other type of boom or implement. The tree trimmer can cut branches and small trees up to approximately 6 inches in diameter. Since the trimmer can be mounted in the bucket of a tractor or a boom of some sort, branches in a tree can be cut without the need of ladders, chainsaws or climbing the tree.

The two blades are reciprocal of each other and are pivotally mounted on a carriage assembly plate. A single hydraulic cylinder is connected to the back side of the blade. As the cylinder is expanded, the blades pivot about a pivot point in the carriage assembly and close the blades cutting any branches between the blades. This arrangement provides for a self centering of the blades about the object to be cut As one blade contacts the object being cut, the object stops the closing action of that blade until the second blade also comes into contact with the object. Once both blades are in contact the tree trimmer will cut the object.

The tree trimmer of this invention generally consists of a carriage assembly, a pair of cutting blades, a means for operating the blades, and an attachment means to attach the tree trimmer to a vehicle. The carriage assembly consists of a top plate and a bottom plate. The plates are separated by spacers and secured together with a plurality of fasteners. A pair of cutting blades are contained between the top plate and the bottom plate. The blades are reciprocal of each other and each have a front end, center region, back end, outer edge, inner edge and a cutting edge extending along the inside edge. The blades are self centering about an object to be cut by pivoting independently from each other. They pivot about separate pivot points in the center region of the blades. A pivot pin or bolt is used as a pivot device extending from the top plate to the bottom plate. A hydraulic cylinder is used to operate the blades. The hydraulic cylinder is pivotally attached to the back ends of the blades. This operation causes the blades to pivot independently about the pivot points resulting in the cutting surfaces closing upon each other. An attachment means, attaches the tree trimmer to a bucket or other lifting means on a tractor or other such vehicle. In one embodiment, the attachment means contains a receptacle for receiving a bale spear in the bucket of a tractor or it can be used to connect tree trimmer to a boom. There is also an optional positioning apparatus for pivoting the tree trimmer for cutting trees, branches, limbs or brush at different angles.

The above mentioned and other objects and features of the present invention will be better understood and appreciated from the following detailed description of the main embodiment thereof, selected for purposes of illustration and shown in the accompanying drawings.

BRIEF DESCRIPTION OF THE DRAWINGS

FIG. 1 is a top view showing the principle embodiment of the hydraulic tree trimmer of this invention.

FIG. 2 is a side view of the tree trimmer of this invention.

FIG. 3 is a top view of a blade for the tree trimmer of this invention.

FIG. 4 is a side view of a blade for the tree trimmer of this invention.

FIG. 6 is a side view showing the tree trimmer of this invention with a positioning apparatus.

FIG. 7 is a view of the positioning apparatus.

DETAILED DESCRIPTION

Figure 5:
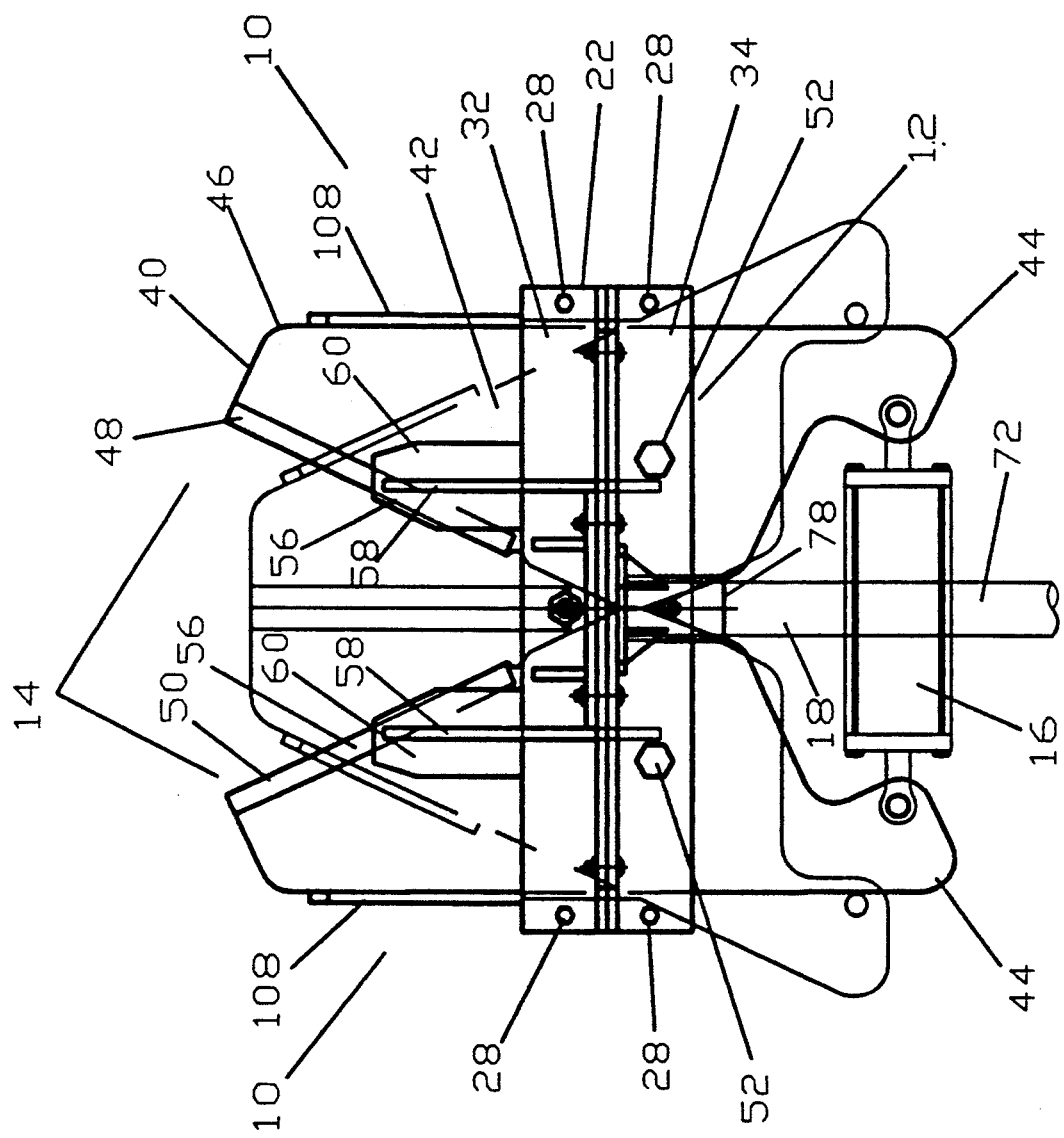
FIG. 5 is another top view of the tree trimmer of this invention showing the blade in an open and closed position.

Referring now to the drawings in general there is shown the preferred embodiment for the hydraulic tree trimmer 10 of this invention. In the most general description, the tree trimmer 10 of this invention consists of a carriage assembly 12, a pair of cutting blades 14, a means for operating the blades 16, an attachment means 18 to attach the tree trimmer 10 to a vehicle and an optional positioning apparatus 20.

The tree trimmer 10 of this invention ia a self centering high reach hydraulically operated tree trimmer generally used in combination with a vehicle 22. The vehicle 22 can be a tractor 86, a backhoe, or any other type of vehicle with a lifting means. In the preferred embodiment and best mode contemplated the vehicle 20 will be a tractor. The vehicle 20 provides a lifting means for allowing the tree trimmer to reach elevated positions to cut limbs or branches up in a tree. The lifting means also general allows the tree trimmer to be used at ground level without any additional changes to the equipment or mounting. The lifting means is simply raised or lowered in accordance with the object being cut. The lifting means can be a bucket or three point lift on a tractor. The attachment means 18 would be changed in accordance with the lifting means and vehicle.

The preferred embodiment and the best mode contemplated of the Hydraulic Tree Trimmer of the present invention are herein described. However, it should be understood that the best mode for carrying out the invention hereinafter described is offered by way of illustration and not by the way of limitation. It is intended that the scope of the invention include all modifications which incorporate its principal design features.

The carriage assembly 12, in the preferred embodiment, has a top plate 22 and a bottom plate 24. The plates, 22 and 24 are separated by spacers 26 and secured together with a plurality of fasteners 28. The fasteners 28 are typically nuts and bolts. The nuts and bolts may be hardened for an adhesional precaution. The spacers 26 are typically rectangular pieces of steel plate having a thickness similar to the thickness of the blades 14, plus a thin washer to provide clearance for the blades 14 to pivot.

The top plate 22 is typically constructed from a pair of angle irons 30 and 32 The angle irons 30 and 32 are designated front angle iron 32 and rear angle iron 30. Each of the angle iron 30 and 32 have a horizontal leg 34 and a vertical leg 36. The vertical legs 36 are joined such that the bottom of the top plate 22 is formed by the horizontal legs 34 of the angle irons 30 and 32. The vertical legs 36 are secured together to make a single top plate 22. They may be secured by bolting (as shown in the enclosed drawings and designated as reference numeral 38), welding, or a combination of bolting and welding or by any other methods known in the art. The angle irons 30 and 32 are typically made of standard steel angle iron but it may also be hardened for additional precautions.

A pair of blades 14 are used in the tree trimmer 10 of this invention. The blades 14, in the preferred embodiment can be constructed from on half, three quarters or one inch, hardened steel depending on the model. The model are typically designated a trimming which has its thinner blades 14, the standard having the three quarters inch blade 14 and the heavy duty having a one inch blade. The blades 14 are generally reciprocal of each other. Each blade 14 has a front end 40, center region 42, back end 44, outer edge 46, inner edge 48 and a cutting edge 50. The cutting edge 50 extends along the inside edge 48 from the front end 40 to a midpoint on the inner edge 48. The cutting edge 50 is typically a tapered region, being tapered from the thickness of the blade to a fraction of the blade thickness. Typically, the cutting edge 50 is tapered to a thickness of one half an inch to one eighth inch. It has been found that this thickness prevents the sharpened edge from chipping and breaking, but still allows the tree trimmer 10 to cut properly. The power of the operation means overcome any bluntness or dullness of the cutting edge 50.

The blades 14 are contained between the top plate 22 and bottom plate 24. The blades 14 pivot about a pivot device 52. The pivot device 52 can be a pivot pin or a nut and bolt. In the preferred embodiment and as illustrated in the drawings, the pivot device is a hardened nut and bolt. In the best mode contemplated, a hardened grade eight bolt is used as the pivot device 52. The pivot device 52 typically extends through the top plate 22, through a bore 54 in the blade 14, and through another bore in the bottom plate 24. The bores in the top plate 22 and bottom plate 24 are appropriately sized and spaced for the particular pivot device 52 being used. The bore 54 is generally located in the center region 42 of blade 14 and it is also sized for a particular pivot device 42 being used. The particular location of the bore 42 and the shape of the blade 14 are in a relationship which allows the blades 14 to close and open properly. The blades 14 pivot independently from each other about separate pivot points, as the operation means operate upon the blades 14.

The arrangement of the blades 14 in the carriage assembly 12, the independent pivoting of the blades 14 and the operation means 16 provides for the blades 14 being self centering about an object to be cut. As the operation means 16 operates to close the blades 14, one or the other of the blades 14 will come into contact with the object being cut before the other. The first blade 14 coming into contact with the object will be stopped by the object. Then as the operation means continues to operate on the blades, the second blade 14 will continue closing upon the object until it also comes into contact with the object. Once both blades 14 are in contact with the object, the cutting action will begin.

A blade stiffener 108 may be added to provide additional strength to the blades 14. The blade stiffeners 108 are typically welded along the outer edge 46 of blades 14. The blade stiffeners 108 are constructed from plate steel and may be hardened for additional strength. Generally, the blades stiffeners 108 are rectangular in shape with rounded corner, but other shapes may also work. The length of the long side of the blade stiffener 108 generally corresponds to the length of the outer edge 46 of the blades 14 which extends beyond the front outside edge of the carriage 12 when the blades 14 are in an open position.

There is a plurality of upper gussets 56 attached to the top plate 22. The upper gussets 56 extend over the blades 14. The upper gusset 58 typically consist of a triangular vertical section 58 which attaches to the top plate 22 and a lower slide plate 60. The lower slide plate 60 attaches to the lower edge of the triangular section 58. The lower slide plate 60 engages the top surface of the blade 14 in the center region 42 and slides across the surface as the blade 14 is operated. The upper gusset 56 help to prevent the blades 14 from twisting and bending when operated upon.

There is also a plurality of lower gussets 62. The lower gussets 62 are attached to the bottom plate 24 and extend over the lower surface of the center region 42 of blades 14. The lower gussets 62 are typically constructed as a rectangular vertical section 64 which attaches to the bottom plate 24 and an upper slide plate 66. The upper slide plate 66 attaches to the upper edge of the rectangular section 64. The upper slide plate 66 engages the bottom surface of the blade 14 in the center region 42 and slides across the surface as the blade 14 is operated. The lower gussets 62 also help to prevent the blades 14 from twisting and bending when operated upon. The lower edge of the lower gussets 62 also act as a skid to protect the tree trimmer 10 when in contact with the ground.

The upper gussets 56 and lower gussets 62 sandwich the blades 14. As indicated above, the gussets 56 and 62 help to prevent the blades from twisting and bending during operation by keeping the blade straight. The gussets 56 and 62 can also be stressed up to approximately thirty tons of pressure to sandwich the blades 14. The stress between the gussets 56 and 62 adds additional protection from twisting and bending. The stress can be added by increasing the tightness of the fastening means 28, reducing the thickness of the spacer 26, attaching the triangular vertical section 58 at a slightly different angle, attaching the rectangular vertical section 64 at a slightly different angle, or a combination of any of these.

In the preferred embodiment, there are two upper gussets 56 and two lower gussets 62, as illustrated. However, there could be more or less depending on the particular size and arrangement of the tree trimmer 10, without departing from the inventive concepts herein disclosed.

An operation means 16 is used to open and close the blades 14. In the preferred embodiment and best mode contemplated, the operation means 16 consists of a hydraulic cylinder 68. The operation means 16 is pivotally attached to the back ends 44 of the blades 14. Typically, there are bores 70 extending through the back ends 44 of the blades 14. A pivot pin or other such attaching means is generally provided with the operation means 16. Proper operation of the blades 14 require that both ends of the operation means 16 be pivotally attached to the back ends 44 of the blades 14. The operation means 16 attached in this manner acts upon the back ends 44 of the blades 14 to cause the blades to pivot independently about the pivot points 52. The operation cause the cutting surfaces to move toward each other to cutting an object therebetween.

The hydraulic cylinder 68 as used in the preferred embodiment can be one of several sizes available. A standard four inch by eight inch hydraulic cylinder is typically used in the standard model. However, for heavy duty use a standard five inch by eight inch hydraulic cylinder can be used.

Typically, the hydraulic cylinder 68 or operation means 16 is controlled by the operator of the vehicle 22. In most instance, the vehicle 22 on which the tree trimmer is installed, such as a tractor 86, will have an internal hydraulic system with an external attaching port for attaching auxiliary equipment such as the tree trimmer 10 of this invention. With standard hydraulic controls the operation means 16 can be controlled by finger tip controls in the cab of the vehicle 22 or by the operators seat. In the preferred embodiment, a power release detent valve is used. This hydraulic valve allows automatic opening of the blades 14, or closing of the hydraulic cylinder, but shuts off the power to the cylinder when the blades are completely opened and the hydraulic cylinder is completely closed. This valve also requires manually holding the valve in an open position during closing of the blades, the cutting operation, and extension of the hydraulic cylinder. This provides an extra safety precaution for the operator and others should something happen.

Figure 9:
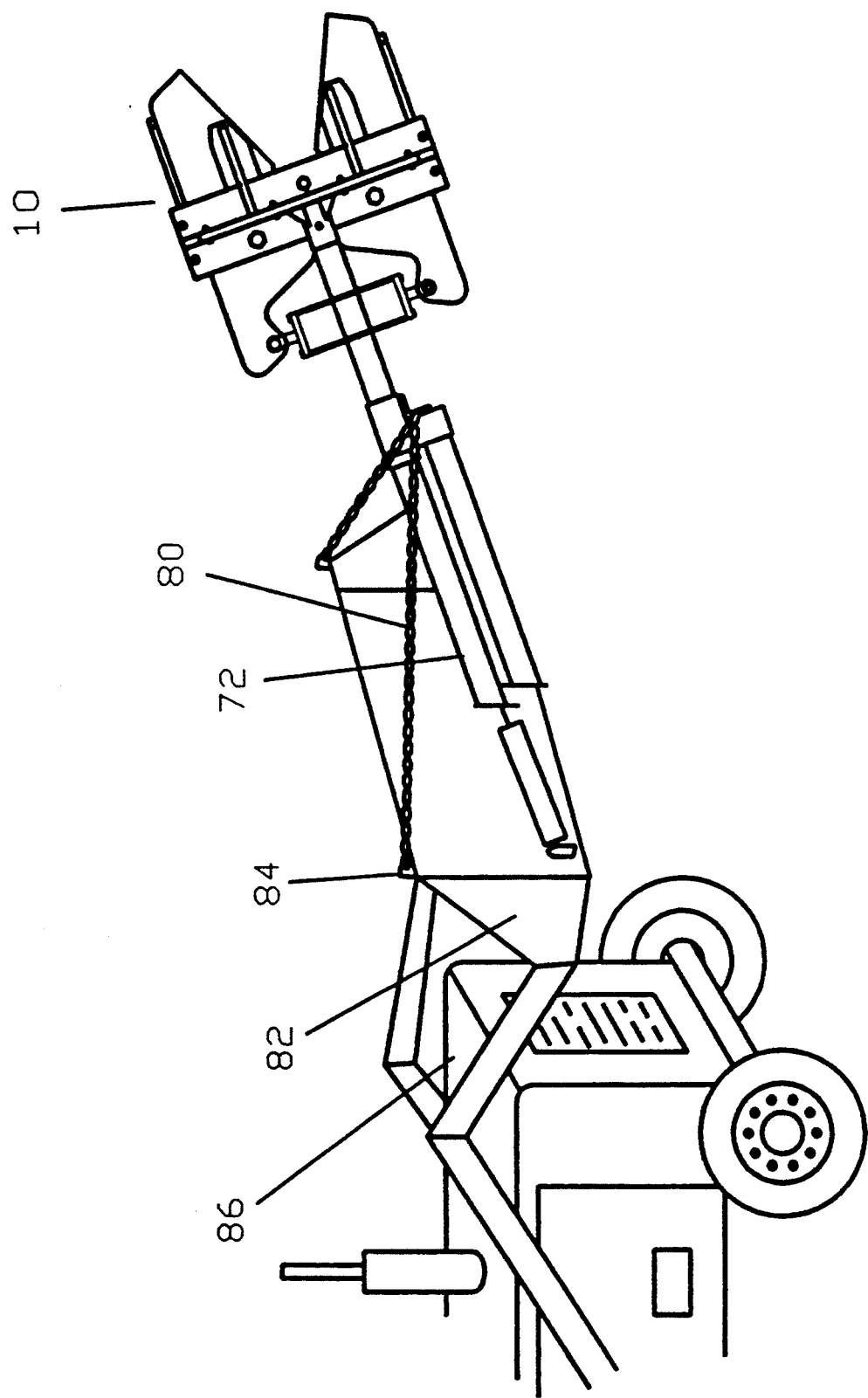
FIG. 9 is a view of the tree trimmer of this invention attached to a bucket of a tractor.

An attachment means 18 is used to attach the tree trimmer 10 to a vehicle 22. There can be several different types depending on the vehicle 22 which the tree trimmer 10 is to be attached. The attachment means 18 generally has a first end 70 which attaches to the carriage assembly 12, an extension member 72 and a second end 74 which attaches to the vehicle 22. The first end 70 typically has a receiving bracket 78. The receiving bracket 78 is attached to the top plate 22, and more particularly to the vertical leg 36 of the rear angle iron 30. The receiving bracket 78 receives the first end of the extension member 72. In the preferred embodiment, the extension member 72 consists of a two and one half inch schedule eighty steel pipe. The extending member 72 extends from the receiving bracket 78 on the tree trimmer 10 to a receiving means on the vehicle 22. In the most simple attachment, the receiving means on the vehicle 86 is a bale spear, typically installed on a bucket 82 of a tractor 86, which is used to lift and transport large round bales of hay. The bale spear slips inside the extension member 72 to attach the tree trimmer 10 to the tractor 86. Chains 80 can be used to stabilize the tree trimmer 10 from rotation and sliding off the spear. One end of the chains 80 would typically attach a midpoint on the extension member 72, as shown on FIG. 9, or to one or more of the fastening means 28 on the carriage assembly 12. The other ends would attach to hooks 84 typically installed on the bucket 82 having the bale spear.

Figure 10:
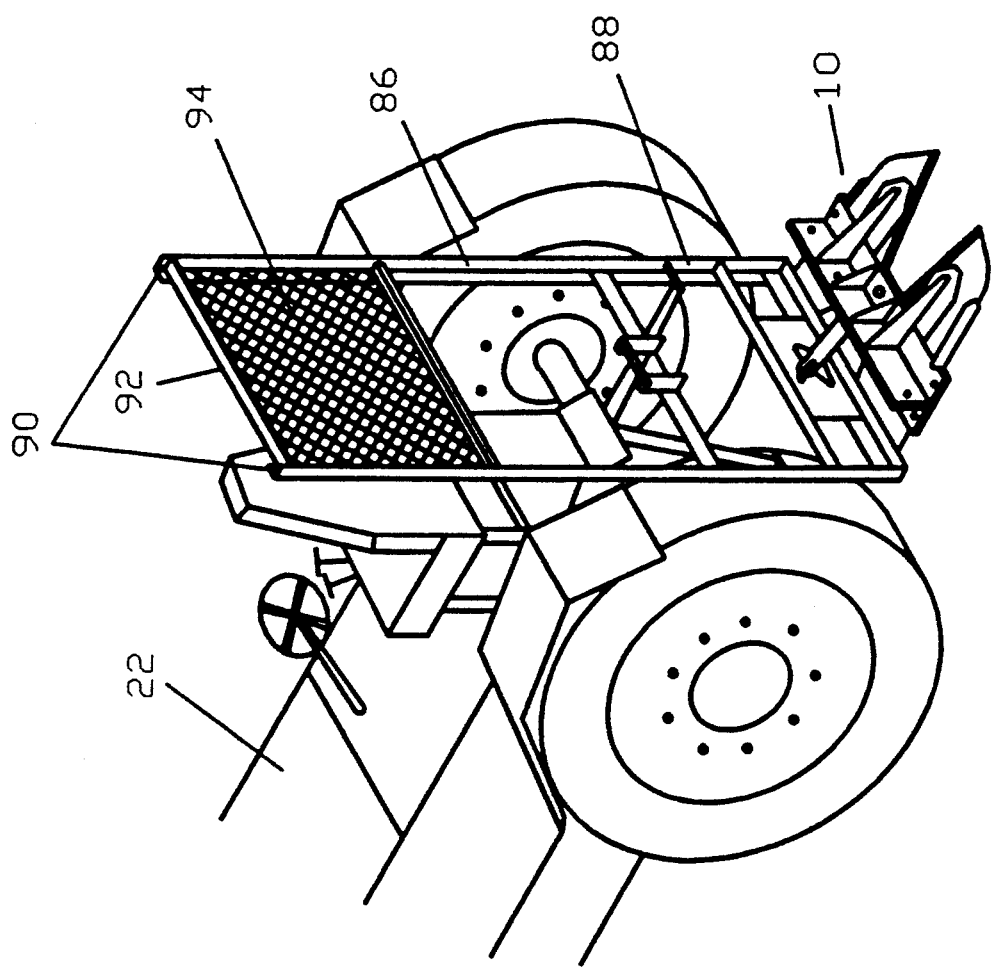
FIG. 10 ia a view of the tree trimmer of this invention attached to a tractor by the way of the tractors three point lift without any operation means.

In another embodiment shown in FIG. 10, a mounting apparatus 88 is used to attach the tree trimmer 10 to the three point lift system of a tractor 86. The mounting apparatus 88 generally consist of a pair of vertical members 90 which attach to the two lifting arms of the three point lifting system and a plurality of horizontal members 92 extending between the vertical members 90. The extension member 72 attaches to a receiving means on one of the horizontal member 72. As shown in FIG. 10, the tree trimmer 10 is attached to a lower horizontal member 92. The turn buckle of the three point lift system attaches to a horizontal member 92 at a midpoint on the vertical members 90 The turn buckle allow for vertical alignment of the vertical members 90. A safety guard 94 may also be included. The safety guard 94 is typically attached to the pair of vertical members 90 and to two of the horizontal members 92. The safety guard 94 typically is constructed from steel wire mesh screen and provides protection to the operator from materials being cut.

Figure 8:
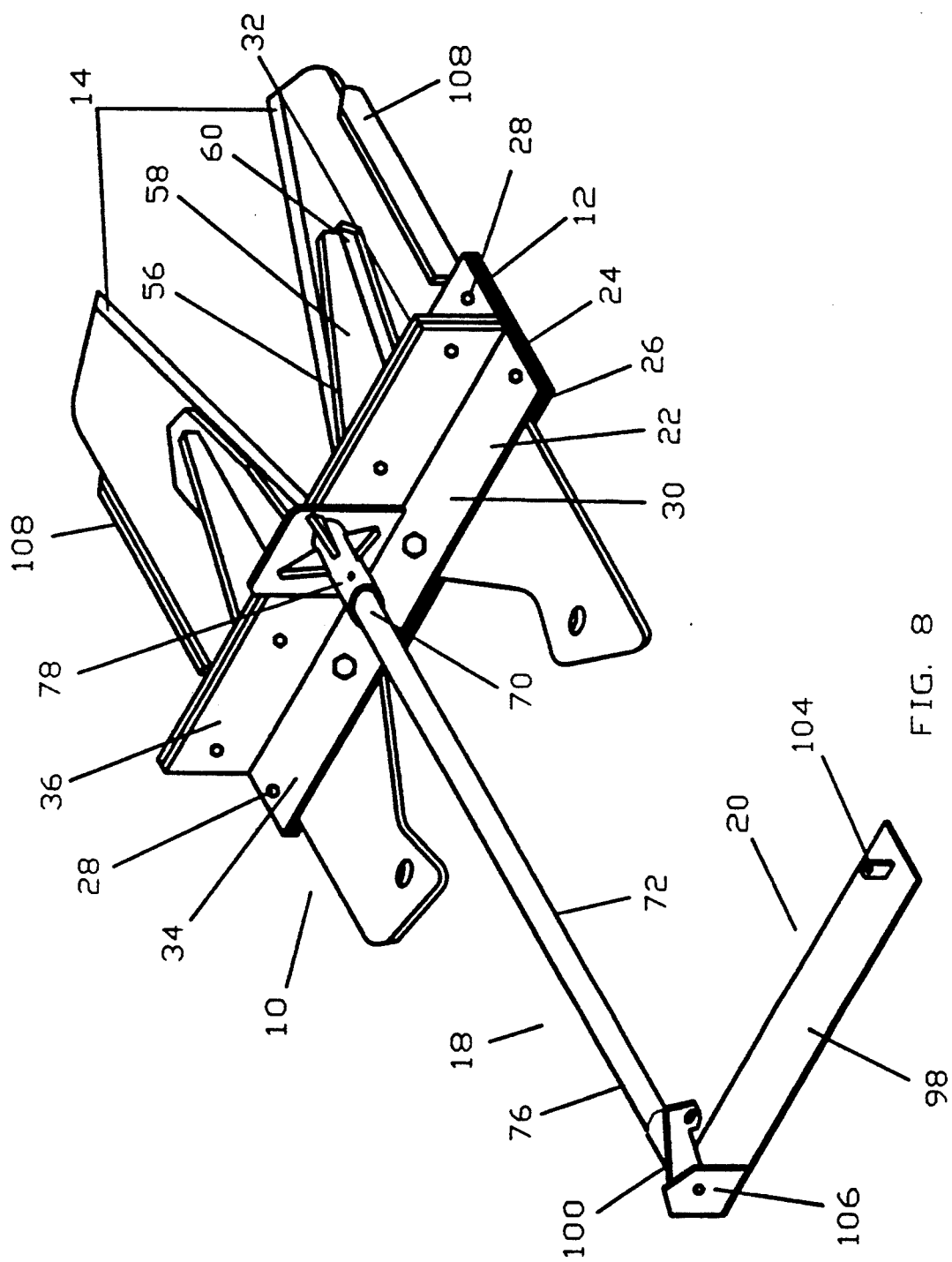
FIG. 8 is perspective view of the tree trimmer showing the positioning apparatus.

An optional positioning apparatus 20, FIGS. 6, 7, and 8, can be attached to the second end 76 of the extension member 72 to provide rotation of the tree trimmer 10 to achieve different cutting angles The positioning apparatus 20 consists of a mounting plate 98, which attaches to the vehicle 22, a positioning bracket 100 securely attached to the second end 76 of the extension member 72 and pivotally attached to the mounting plate 98 via a first fixed bracket 106, and a second operation means 102 extending between the first fixed bracket 106 and a second fixed bracket 104 attached to the mounting plate 98. The second operation means 102 is typically a hydraulic cylinder as shown in FIG. 7, however other apparatuses could also be used. The operation of the second operation means 102 causing rotation of the tree trimmer 10 to provide a range of cutting angles.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A hydraulic tree trimmer comprising:

a carriage assembly having a top plate and a bottom plate separated by spacers and secured together with a plurality of fasteners, said top plate comprises a pair of angle irons, each of said angle irons having a horizontal leg and a vertical leg, said vertical legs being joined such that said top plate is formed by said horizontal legs of said angle irons, and said angle irons having a front angle iron and a rear angle iron;

a pair of cutting blades contained between said top plate and said bottom plate, said blades having a thickness of said spacers and being reciprocal of each other and each having a front end, center region, back end, outer edge, inner edge and a straight cutting edge extending along said inside edge from said front end to a midpoint towards said back end, said blades being self centering about an object to be cut by pivoting independently from each other about separate pivot points in said center region of said blades and pivoting about a pivot device extending from said top plate to said bottom plate;

means to operated said blades being pivotally attached to said back ends of said blades, said means acting upon said back ends of said blades to cause said blades to pivot independently about said pivot points, said means causing said cutting surfaces to move toward each other cutting an item therebetween; and pin or an attachment means having a first and second end, said first end connected to said carriage assembly and said second end attached to a vehicle.

2. A hydraulic tree trimmer comprising:

a carriage assembly having a top plate and a bottom plate separated by spacers and secured together with a plurality of fasteners;

a pair of cutting blades contained between said top plate and said bottom plate, said blades being reciprocal of each other and each having a front end, center region, back end, outer edge, inner edge and a straight cutting edge extending along said inside edge from said front end to a midpoint towards said back end, said blades being self centering about an object to be cut by pivoting independently from each other about separate pivot points in said center region of said blades and pivotally about a pivot device extending from said top plate to said bottom plate;

a plurality of upper gussets, said gussets attached to said top plate and extending over and in a sliding engagement with said center region of said blades to prevent said blades from twisting and bending when operated upon;

means to operated said blades pivotally attached to said back ends of said blades, said means acting upon said back ends of said blades to cause said blades to pivot independently about said pivot points, said means causing said cutting surfaces to move toward each other cutting an item therebetween; and an attachment means having a first and second end, said first end connected to said carriage assembly and said second end attached to a vehicle.

3. The hydraulic tree trimmer as set forth in claim 2 in which said upper gusset comprises a triangular vertical section which attaches to said top plate and a lower slide plate attached to a lower edge of said triangular section, said slide plate being in a sliding engagement with said blades.

4. A hydraulic tree trimmer comprising:
   a carriage assembly having a top plate and a bottom plate separated by spacers and secured together with a plurality of fasteners;
   a pair of cutting blades contained between said top plate and said bottom plate, said blades being reciprocal of each other and each having a front end, center region, back end, outer edge, inner edge and a straight cutting edge extending along said inside edge from said front end to a midpoint towards said back end, said blades being self centering about an object to be cut by pivoting independently from each other about separate pivot points in said center region of said blades and pivotally about a pivot device extending from said top plate to said bottom plate;
   a plurality of lower gussets, said lower gussets attached to said bottom plate and extending over and in a sliding engagement with a bottom side of said center region of said blades to prevent said blades from twisting and bending when operated upon; and said lower gussets acting as a skid to protect said hydraulic tree trimmer when in contact with the ground;
   means to operated said blades being pivotally attached to said back ends of said blades, said means acting upon said back ends of said blades to cause said blades to pivot independently about said pivot points, said means causing said cutting surfaces to move toward each other cutting an item therebetween; and
   an attachment means having a first and second end, said first end connected to said carriage assembly and said second end attached to a vehicle.

5. The hydraulic tree trimmer as set forth in claim 4 in which said lower gusset comprises a rectangular vertical section which attaches to said bottom plate and an upper slide plate attached to an upper edge of said rectangular section, said slide plate being in a sliding engagement with a bottom side of said blades.

6. The hydraulic tree trimmer as set forth in claim 1 further comprising a positioning apparatus attached to said attachment means for rotating said tree trimmer to different cutting angles.

7. The hydraulic tree trimmer as set forth in claim 6 in which said positioning apparatus comprises:
   a mounting plate pivotally attached to said second end of said attachment means, said mounting plate being securely mountable to a vehicle,
   a positioning bracket securely attached to said second end on said attachment means,
   a fixed bracket attached to said mounting plate, and
   a second operation means extending between said positioning bracket and said fixed bracket, said second operation means causing rotation of said tree trimmer when operated.

8. The hydraulic tree trimmer as set forth in claim 1 further comprising blade stiffeners, said blade stiffeners comprising steel plates welded to said outer edge of said blade.

9. A self centering high reach hydraulic tree trimmer in combination with a vehicle comprising:
   a carriage assembly having a top plate and a bottom plate separated by spacers and secured together with a plurality of fasteners; said top plate comprising a pair of angle irons, each of said angle irons having a horizontal leg and a vertical leg, said vertical legs being joined such that said top plate is formed by said horizontal legs of said angle irons, and said angle irons having a front angle iron and a rear angle iron;
   a pair of cutting blades contained between said top plate and said bottom plate, said blades being reciprocal of each other and each having a front end, center region, back end, outer edge, inner edge and a straight cutting edge extending along said inside edge from said front end to a midpoint towards said back end, said blades being self centering about an object to be cut by pivoting independently from each other about separate pivot points in said center region of said blades and pivoting about a pivot device extending from said top plate to said bottom plate;
   a plurality of upper gussets, said upper gussets attached to said top plate and extending over and in a sliding engagement with said center region of said blades to prevent said blades from twisting and bending when operated upon,
   a plurality of lower gussets, said lower gussets attached to said bottom plate and extending over and in a sliding engagement with a bottom side of said center region of said blades to prevent said blades from twisting and bending when operated upon, and said lower gussets acting as a skid to protect said hydraulic tree trimmer when in contact with the ground,
   means to operate said blades comprising a hydraulic cylinder pivotally attached to said back ends of said blades, said means acting upon said back ends of said blades to cause said blades to pivot independently about said pivot points and causing said cutting surfaces to move toward each other cutting an item therebetween; and
   an attachment means having a first and second end, said first end connected to said carriage assembly and said second end attached to said vehicle, said attachment means comprising a receiving bracket on said first end of said attachment means, said receiving bracket attached to said rear angle iron of said top plate, and an extending member extending from said receiving bracket and extending to a receiving means on said vehicle, said vehicle having the capability of raising said hydraulic tree trimmer to an elevated position.

10. The hydraulic tree trimmer as set forth in claim 9 in which said upper gusset comprises a triangular vertical section which attaches to said top plate and a lower slide plate attached to a lower edge of said triangular section, said slide plate being in a sliding engagement with said blades.

11. The hydraulic tree trimmer as set forth in claim 9 in which said lower gusset comprises a rectangular vertical section which attaches to said bottom plate and an upper slide plate attached to an upper edge of said rectangular section, said slide plate being in a sliding engagement with a bottom side of said blades.

12. The hydraulic tree trimmer as set forth in claim 9 further comprising a positioning apparatus attached to said attachment means for rotating said tree trimmer to different cutting angles.

13. The hydraulic tree trimmer as set forth in claim 12 in which said positioning apparatus comprises;

a mounting plate pivotally attached to said second end of said attachment means, said mounting plate being securely mountable to a vehicle, a positioning bracket securely attached to said second end on said attachment means, a fixed bracket attached to said mounting plate, and a second operation means extending between said positioning bracket and said fixed bracket, said second operation means causing rotation of said tree trimmer when operated.

* * * * *